US007840934B2

(12) United States Patent
Sayal et al.

(10) Patent No.: US 7,840,934 B2
(45) Date of Patent: Nov. 23, 2010

(54) METHOD AND SYSTEM FOR INTEGRATING WORKFLOW MANAGEMENT SYSTEMS WITH BUSINESS-TO-BUSINESS INTERACTION STANDARDS

(75) Inventors: Mehmet Sayal, Sunnyvale, CA (US);
Fabio Casati, Palo Alto, CA (US);
Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2884 days.

(21) Appl. No.: 09/943,223

(22) Filed: Aug. 29, 2001

(65) Prior Publication Data

US 2003/0083910 A1    May 1, 2003

(51) Int. Cl.
*G06F 9/44* (2006.01)
(52) U.S. Cl. ...................................... 717/102
(58) Field of Classification Search ......... 717/100–108, 717/110, 113, 120–121; 709/203; 705/7, 705/10, 26, 50, 69
See application file for complete search history.

(56) References Cited

U.S. PATENT DOCUMENTS

| | | | | |
|---|---|---|---|---|
| 5,379,423 | A * | 1/1995 | Mutoh et al. ................ | 707/204 |
| 6,225,998 | B1 * | 5/2001 | Okita et al. .................. | 715/853 |
| 6,442,528 | B1 * | 8/2002 | Notani et al. ................... | 705/9 |
| 6,697,799 | B1 * | 2/2004 | Neal et al. ...................... | 707/3 |
| 6,728,947 | B1 * | 4/2004 | Bengston ..................... | 717/103 |
| 6,820,135 | B1 * | 11/2004 | Dingman et al. ............. | 709/246 |
| 6,823,513 | B1 * | 11/2004 | McNally et al. ............. | 718/104 |
| 6,836,773 | B2 * | 12/2004 | Tamayo et al. ................. | 707/6 |
| 6,886,007 | B2 * | 4/2005 | Leymann et al. ............... | 707/3 |
| 6,957,199 | B1 * | 10/2005 | Fisher .......................... | 705/78 |
| 7,043,492 | B1 * | 5/2006 | Neal et al. .................. | 707/101 |
| 7,051,071 | B2 * | 5/2006 | Stewart et al. .............. | 709/204 |
| 7,051,072 | B2 * | 5/2006 | Stewart et al. .............. | 709/204 |
| 7,076,521 | B2 * | 7/2006 | Davison ..................... | 709/203 |
| 7,216,093 | B1 * | 5/2007 | Gupta et al. ................... | 705/26 |
| 7,249,157 | B2 * | 7/2007 | Stewart et al. .............. | 709/204 |
| 7,254,581 | B2 * | 8/2007 | Johnson et al. ............. | 707/100 |

OTHER PUBLICATIONS

Glushko et al, "An XML framework for agent based E commerce", Comm. of the ACM, vol. 42, No. 3, pp. 106-114 1999.*

(Continued)

*Primary Examiner*—Anna Deng

(57) ABSTRACT

A method and system for integrating workflow management systems with business-to-business interaction standards. An automatic business-to-business (B2B) template generator is provided for supporting workflow design. The B2B template generator automatically generates process templates and service templates based either on a description of a business-to-business interaction standard is received or a structured representation of the business-to-business interaction standard. When the (B2B) template generator receives the description of business-to-business interaction standard as the input, the (B2B) template generator first converts the description of the business-to-business interaction standard into a structured representation of the business-to-business interaction standard. At least process template is automatically generated based on the structured representation of the business-to-business interaction standard. The template (e.g., B2B service template or B2B process template) can be utilized by a user to design both quickly and efficiently a complete process (e.g., a workflow with B2B interaction points).

18 Claims, 9 Drawing Sheets

OTHER PUBLICATIONS

Anderson et al, "Workflow interoperability nabling E commerce", www.wfmc.org, pp. 1-11, Apr. 1999.*

A Common object Model Discussion Paper, document No. WfMC TC 1022, The Workflow Management Coalition, pp. 1-16, Jan. 1998.*

Benjamin et al, A workflow analaysis and design environment (WADE), ACM Proc. of winter simulation conf. pp. 597-603, 1995.*

Workflow Management Coalition Interface 1: Process Definition Interchange Process Model, Dcoument No. WfMC TC 1016-P, Author Work Group 1, pp. 1-89, Jul. 15, 1998.*

Interflow application Model: The Design of corss organizational workflow processes and distributed operations management, Document WFMC TC 2102, The Workflow Management Coalition Specification, pp. 1-31, Feb. 1997.*

Hollingsworth, "Workflow Managememnt Coalition The workflow Reference Model", Document No. TC00-1003, pp. 1-55, The Workflow Management Coalition Specification, Jan. 19, 1995.*

Anderson et al, "Workflow interoperability enabling E commerce", www.wfmc.org, pp. 1-11, Apr. 1999.*

* cited by examiner

METHOD AND SYSTEM FOR INTEGRATING WORKFLOW MANAGEMENT SYSTEMS WITH BUSINESS-TO-BUSINESS INTERACTION STANDARDS

FIELD OF THE INVENTION

The present invention relates generally to electronic business technology, and more particularly, to a method and system for integrating workflow management systems with business-to-business interaction standards.

BACKGROUND OF THE INVENTION

Workflow management is a rapidly evolving technology that many businesses in a variety of industries utilize to handle business processes. A business process, as defined by the Workflow standard—Terminology & glossary, Technical Report WFMC-TC-1011, Workflow Management Coalition, June 1996. Versions 2.0, is simply a set of one or more linked activities that collectively realize a business objective or a policy goal, typically within the context of an organizational structure defining functional roles and relationships. A workflow is defined as the automation of a business process, in whole or in part, during which documents, information, or activities are passed from one participant to another, according to a set of predefined rules. Business processes are often automated using Workflow Management Systems (WfMSs). WfMSs are tools that enable model-driven design, analysis, and simulation of business processes, which can be designed from scratch or from templates that support rapid application development. WfMSs also provide features for monitoring the execution of business processes and for automatically reacting to exceptional situations. The integration of WfMSs with Enterprise Application Integration (EAI) tools further increases the effectiveness of these systems, and enables them to handle the two crucial aspects of process automation: end-to-end process flow management and interaction with the (heterogeneous) invoked applications. Finally, enhancement of WfMSs with support for B2B interaction standards will result in complete automation of business operations both within and across organizational boundaries.

Organizations need to integrate their processes in order to efficiently trade goods and services electronically and perform e-business transactions. Several industry standards, such as RosettaNet and the Common Business Library (CBL), are being developed in order to allow organizations to interoperate by defining common ontology, syntax for message exchanges, and flow of interactions among the business processes across organization boundaries.

In order to interact with a trade partner, an organization must not only be able to send and receive messages and carry out conversations according to a specific standard, but also be capable of coordinating the internal business processes with the external interactions. In addition, since B2B standards are constantly evolving as a result of the changes in the technology and needs of organizations, it is necessary for the business partners to quickly and easily adapt to the changes in the standards. The implementation of new standards and their integration with the internal business processes often require a lot of manual effort and take many months to complete. Moreover, the users (e.g., the designers of internal business processes) are usually required to deal with the details of B2B conversations, message formats, data mapping, etc. The process designer's time is better used in concentrating on designing the business logic of their organizations' business processes rather than worrying about the details of B2B interaction standards.

There exist many B2B interaction standards already in use or under development. Enterprises have to support many different standards in order to be able to carry on trade partnerships with multiple partners, because each partner might have adopted a different standard. In summary, even after B2B interaction standards are defined, there exist many important challenges that need to be addressed in order to build and operate on-line trade partnerships quickly and easily. Those challenges include how to minimize the manual effort in integration of existing and new internal business processes with external B2B interaction standards, how to adapt to the changes in B2B interaction standards, and how to hide B2B interaction details from the users, and how to support multiple B2B interaction standards in conversations with the trade partners.

Organizations may often need to carry on a conversation (i.e., exchange several messages with one or more business partners) in order to accomplish B2B interactions. Unfortunately, most B2B standards do not describe the complete conversational logic between trade partners. Some standards, such as EDI, only describe how individual transactions should be carried on. Some others, such as OBI and cXML, describe the contents of individual message exchanges. RosettaNet and CBL are two recently initiated B2B interaction standards that aim at describing the complete conversational logic between trade partners. Although those standards describe the contents of individual messages in a structured format, using either XML DTDs or schema language, the overall conversational logic is described as a combination of flat text and graphical representation (UML diagrams). In other words, those conversational logic descriptions aim the humans as the target audience. Process designers are supposed to read, understand, and implement the conversational logic themselves. Thus, intensive manual effort is required to implement those standards.

FIG. 9 illustrates a prior art partner interface process (PIP) that defines an interaction standard for a request for quote. A PIP definition includes a UML graph and text that describes the process. One problem with these high-level descriptions is that the UML graphs and unstructured textual representations are very difficult to interpret and use for automatically implementing the PIP.

Typically, only humans can interpret and use the descriptions. However, the standards may be interpreted differently that may lead to compatibility issues between business parties. In fact intensive manual efforts are required by process designers to integrate an external interaction standard with a particular workflow management system. This manual development is time consuming and difficult since there is no mechanism in the prior art to automatically generate B2B interaction standard compliant business processes or to adapt existing business processes to become B2B interaction capable.

Another problem that a designer of business processes faces is that there are many competing business-to-business interaction standards. Business partners, suppliers, vendors, and clients may implement different interaction standards. For example, a first partner may utilize a RosettaNet B2B interaction standard, whereas a second partner may utilize a CBL B2B interaction standard. In order to enable electronic commerce with both the first partner and the second partner, the designer is required to manually integrate its internal business processes with both the RosettaNet business-to-business interaction standard and the CBL B2B interaction standard.

This problem is further exacerbated by the constant evolving nature of these external B2B interaction standards. For example, a designer can work many months to integrate the internal processes with a first version of RosettaNet B2B interaction standard only to find that other new partners are now using another, more current, RosettaNet B2B interaction standard. The designer is then forced to integrate the internal processes to the new version of the RosettaNet B2B interaction standard. As can be appreciated, the designers can easily become bogged down with the detail of integrating the internal business processes with many different interaction standards and/or different versions of the same interaction standard.

There exist commercially available products that purport to support RosettaNet and other B2B interaction standards. Unfortunately, most of those products only provide simple tools for sending and receiving XML messages. A few of these products attempt to address the problem of integrating B2B interaction standards with internal workflows.

WebMethods includes a component that enforces the XML message exchange specifications of PIPs, such as preparing, submitting, receiving, and parsing XML documents, and waiting for acknowledgment and response messages. Unfortunately, the actual implementation of the conversational logic of PIPs still requires considerable manual effort.

BlueStone's Total-e-B2B product provides tools to develop, deploy, and manage B2B transactions. This product supports standards, such as XML, EDI, J2EE, etc. Unfortunately, the product does not support any standard that defines B2B conversations, such as CBL and RosettaNet.

Vitria's BusinessWare product has a RosettaNet centric version that purportedly supports currently published PIPs. The product provides basic functionality that is required to carry out B2B interactions based on RosettaNet PIP definitions. The product also performs data mapping from DUNS, UNSPSC, and GTIN standards, which are data standards accepted by RossettaNet. Unfortunately, this product does not provide integration with any internal workflow management systems.

BEA's WebLogic Collaborate Enabler for RosettaNet provides a "Process Integrator" that manages the exchange of XML messages with trade partners. Moreover, WebLogic provides templates for currently published RosettaNet PIPs. It appears that new templates are created manually from PIP definitions by WebLogic and provided to the customers in a template library.

While these approaches offer limited support for interactions among workflows executed in different organizations, these approaches do not provide an efficient approach for addressing the problem of integrating B2B interaction standards with internal processes. In this regard, it is desirable for there to be a mechanism that enables fast, template-driven generation of processes and services that can interact according to B2B interaction standards. Furthermore, it is desirable for there to be a complete methodology for automatically generating and using process and service templates that comply with B2B standards.

Based on the foregoing, there remains a need for a method and system for a mechanism that supports the integration of internal business processes with different external B2B interaction standards and that overcomes the disadvantages set forth previously.

SUMMARY OF THE INVENTION

According to one embodiment of the present invention, a method and system for integrating workflow management systems with business-to-business interaction standards is described.

One aspect of the present invention is to reduce the amount of manual effort required for integrating new and existing internal business processes with external business-to-business interaction standards.

Another aspect of the present invention is to adapt new and existing internal business processes to changes in the business-to-business interaction standards.

Another aspect of the present invention is to support and enable different business-to-business interaction standards in conversations with trade partners.

Another aspect of the present invention is to hide the details involved with business-to-business interaction from process designers so that the designers can focus on designing business logic for the business processes of the organization.

According to one embodiment, a method and system for integrating workflow management systems with business-to-business interaction standards are described. An automatic business-to-business (B2B) template generator is provided for supporting workflow design. The B2B template generator automatically generates process templates and service templates based either on a description of a business-to-business interaction standard that is received or a structured representation of the business-to-business interaction standard. When the (B2B) template generator receives the description of business-to-business interaction standard as the input, the (B2B) template generator first converts the description of the business-to-business interaction standard into a structured representation of the business-to-business interaction standard. At least process template is automatically generated based on the structured representation of the business-to-business interaction standard. The template (e.g., B2B service template or B2B process template) can be utilized by a user to design both quickly and efficiently a complete process (e.g., a workflow with B2B interaction points).

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A method and system for integrating workflow management systems (WfMSs) with business-to-business interaction standards are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System 100

Figure 1:
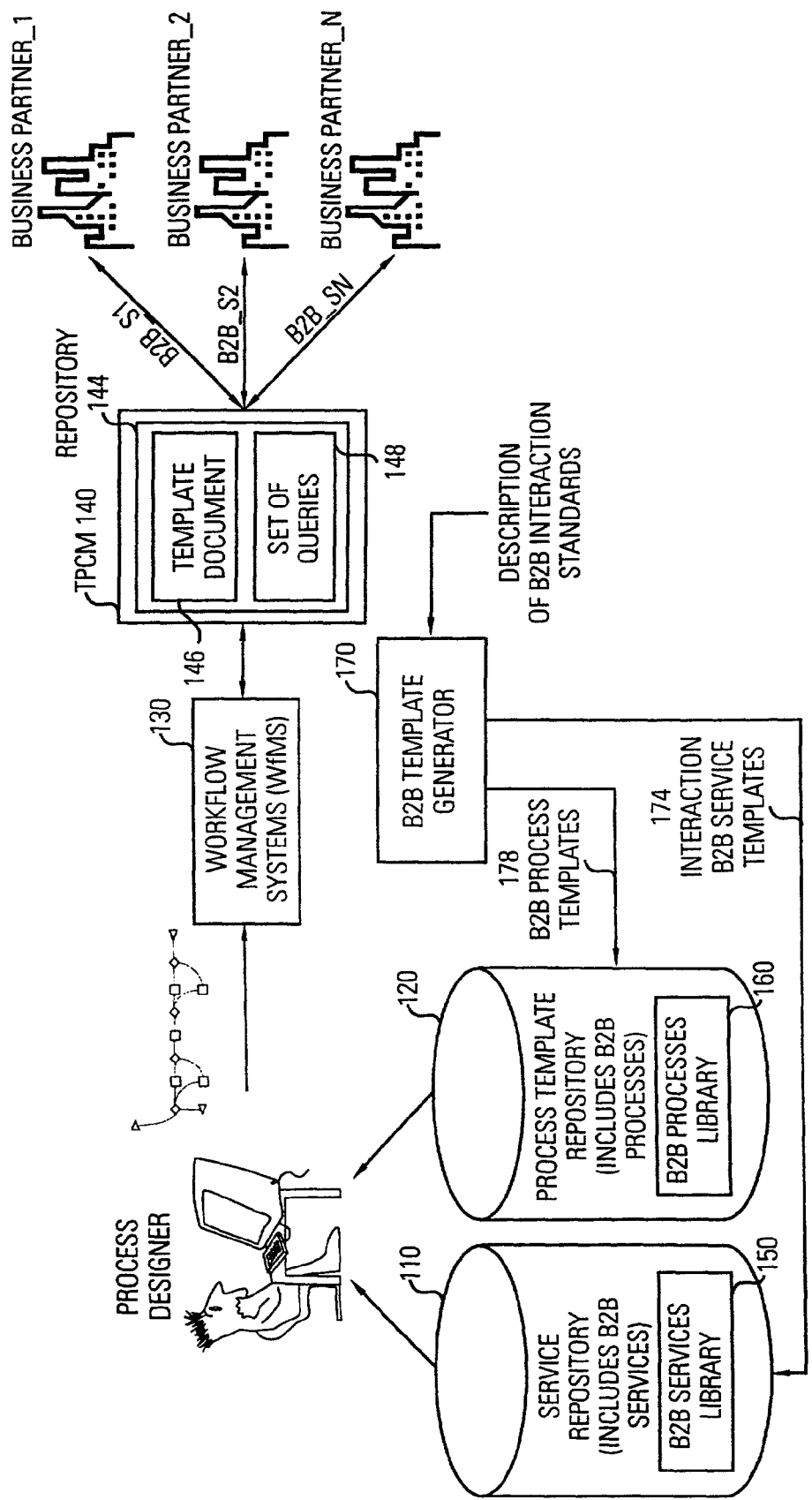
FIG. 1 is a block diagram illustrating a system for supporting the integration of workflow management systems with business-to-business interaction standards according to one embodiment of the present invention.

FIG. 1 is a block diagram illustrating a system 100 for supporting the integration of workflow management systems (WfMSs) with business-to-business (B2B) interaction standards according to one embodiment of the present invention. The present invention provides design support tools for supporting the integration of workflow management systems (WfMSs) with B2B integration standards.

The present invention includes a mechanism for automatically generating B2B service and process templates, a trade partners conversation manager (TPCM) for managing the conversation between business partners, and a repository of B2B services and process templates that can be readily accessible to and employed by a workflow designer. Each of these components is described in greater detail hereinafter.

The design tools provided by the present invention allows easy and fast adoption of B2B interaction standards. Service and process templates can be automatically generated from structured definitions of the standards. Those templates are stored in a repository and used by process designers to easily enhance the business processes with B2B interaction capability.

The tools provided by the present invention allow designers to design business processes both quickly and easily. Moreover, the processes, once designed, require minimal management effort since the processes are to a great measure transparent to changes in the standards and transparent to the choice of the B2B interaction standard employed by a trade partner.

In this embodiment, the system 100 of the present invention includes a service repository 110, a process template repository 120, a workflow engine 130, a trade partners conversation manager (TPCM) 140, and a business-to-business (B2B) template generator 170.

The service repository 110 stores various services and includes a B2B service library 150 that is made available and accessible to the workflow designer. The B2B service library 150 stores predefined sets of workflow activity definitions that can be reused in a workflow to send and receive B2B messages and to transfer data between those messages and workflow variables. B2B services are the services in which an interaction with a trade partner (e.g., a single message exchange or a conversation with another organization) takes place. The service templates are described in greater detail hereinafter.

The process template repository 120 includes a B2B process template library 160 that is made available and accessible to the workflow designer. The B2B process template library 160 includes reusable process skeletons that implement the conversational logic according to a given B2B standard (e.g., a RosettaNet PIP). These process skeletons can be extended by process designers to include the required business logic (e.g., local business services). The B2B service library 150 and the B2B process template library 160 can be used to accelerate and to ease the development of workflow processes that have B2B interaction capability. The process templates are described in greater detail hereinafter.

The trade partners conversation manager (TPCM) 140 is an application that executes B2B services by mapping internal workflow data representation into a format required by a B2B interaction standard and vice versa. The trade partners conversation manager (TPCM) 140 also manages conversations between the trade partners. The TPCM 140 is described in greater detail hereinafter.

The business-to-business (B2B) template generator 170 receives a description of B2B interaction standards and based thereon generates B2B templates, such as B2B interaction service templates 174 and B2B process templates 178. These templates 174 and 178 can then be stored in the B2B services library 150 and the B2B processes library 160, respectively.

Workflow Design Processing Steps

Figure 2:
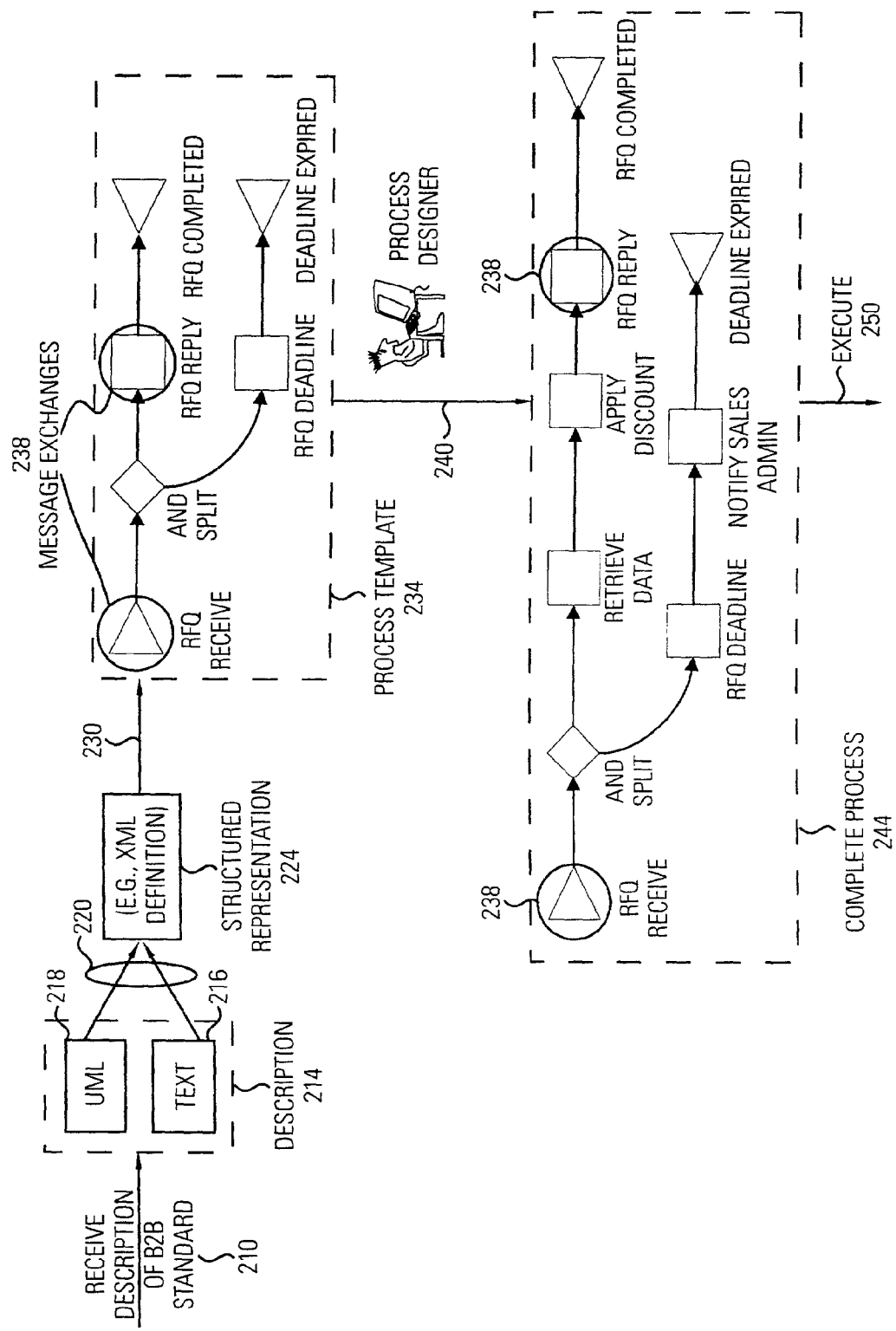
FIG. 2 illustrates how the process templates are generated and how the process templates are utilized in the design of workflows according to one embodiment of the present invention.

FIG. 2 illustrates how the process templates are generated and how the process templates are utilized in the design of workflows in accordance with one embodiment of the present invention. The present invention extends workflow technology in order to support B2B interaction standards by performing the following steps.

In step 210, a high-level description 214 of a business-to-business interaction standard (e.g., a partner interface process (PIP) set forth by the RosettaNet consortium) is received. The high-level description 214 typically includes text 216 and a graphical illustration of data flow 218 (e.g., an illustration described with the uniform modeling language (UML)).

In step 220, a structured representation 224 (e.g., an XML metadata interchange (XMI) definition) of the standard is generated based on the high-level description 214 of a business-to-business (B2B) interaction standard. The structured representation 224 includes a description of complete B2B conversations, as well as, the contents of individual message exchanges in the industry standards. As described in greater detail hereinafter, the developers of industry standards may prepare and provide structured representations 224 of B2B conversations.

In step 230, B2B service and process templates (e.g., process template 234) are automatically generated from the structured representations 224 of B2B interaction standards. The process templates 234 can include message exchanges 238 (also referred to herein as interaction points or interaction services).

In step 240, a process designer (e.g., a workflow designer) generates a complete process 244 by using the process template 234. For example, new processes can be created from process templates that support B2B interactions. In the current example, the designer enhances the process template 234 with local services, such as "Retrieve Data", "Apply Discount", and "Notify Sales Administration."

Alternatively, the designer can start with existing internal workflow processes and enhance those processes by adding B2B interaction capability. The enhancement of existing internal processes so that the processes are made interaction capable (i.e., the processes are enabled to perform B2B interactions with other trade partners) can involve adding interaction services 238, such as, "Request for Quote (RFQ) Receive" and "Request for Quote (RFQ) Reply."

In step 250, the complete process 244 (e.g., a new process or an enhanced process) is executed by the workflow management system (WfMS) 130 and the trade partners conversation manager (TPCM) 140. The WfRMS 130 manages and monitors the processes in a manner that is known by those of ordinary skill in the art. The TPCM 140 executes the B2B interaction steps (e.g., B2B services) in those processes and enforces the B2B interaction standard definitions.

In this manner, the design tools, provided by the present invention, enable process templates, which correspond to different interaction standards, to be generated in an efficient and timely fashion with minimal manual effort by the process designer. Consequently, the process design support tools of the present invention enable a business to communicate with other business partners, who may comply with different business-to-business interaction standards. For example, the design tools of the present invention enable the request for quotes from multiple business partners, who comply with different B2B interaction standards, in the same workflow. Furthermore, the business can quickly and efficiently adapt to new business-to-business interaction standards or newer versions of business-to-business interaction standards.

B2B Template Generator 170

Figure 3:
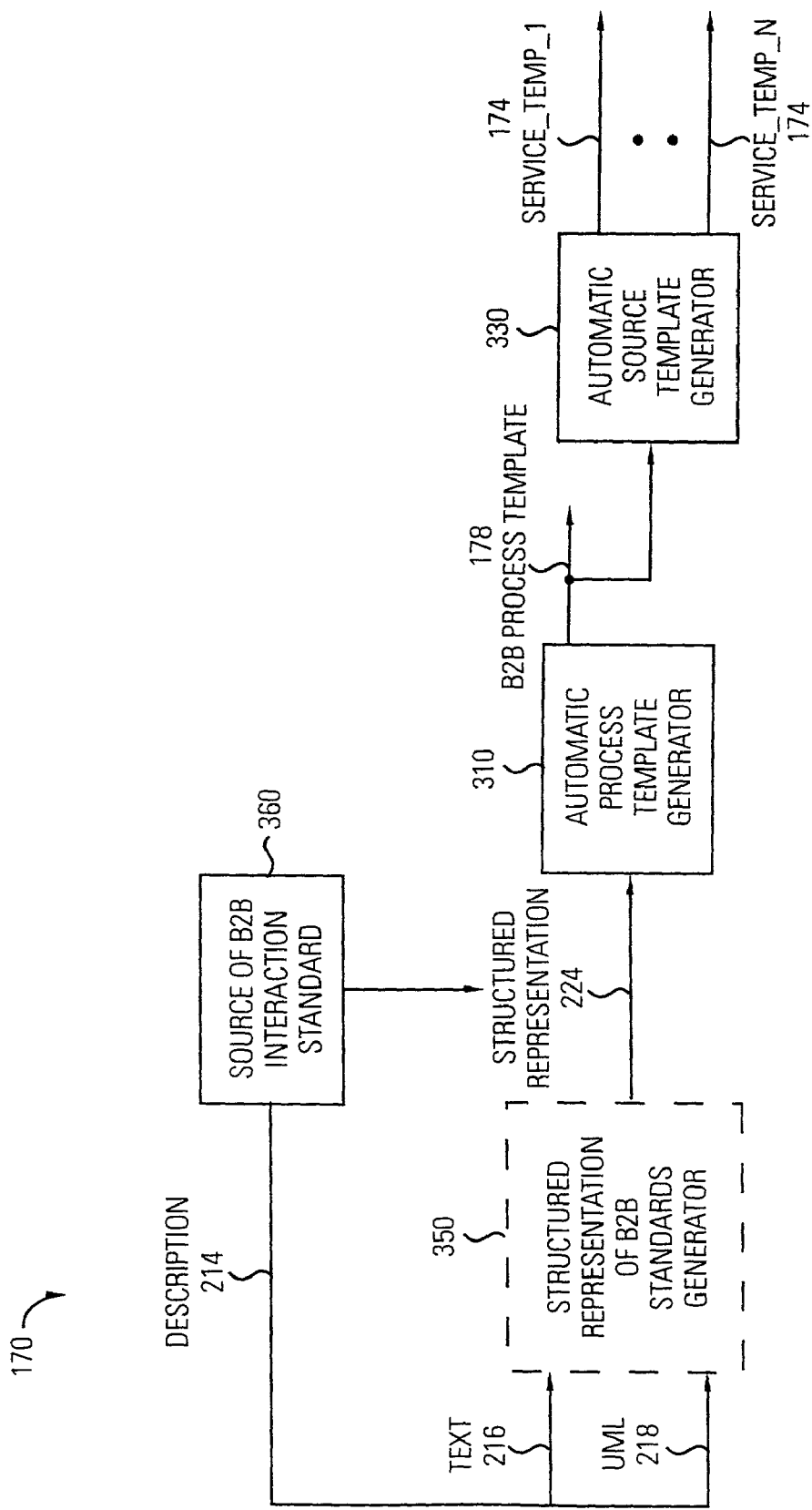
FIG. 3 illustrates in greater detail the B2B template generator of FIG. 1 according to one embodiment of the present invention.

FIG. 3 illustrates in greater detail the B2B template generator 170 of FIG. 1 according to one embodiment of the present invention. The B2B template generator 170 includes an automatic process template generator 310 for receiving a structured representation 224 of a B2B interaction standard (e.g., a structured definition of the interaction standard) and based thereon for automatically generating at least one business-to-business process template 178.

The B2B template generator 170 also includes an automatic service template generator 330 that is coupled to the automatic process template generator 310 for receiving the B2B process template 234. The automatic service template generator 330 automatically generates at least one service template 174 (e.g., service_template_1, service_template_2, . . . , service template_N) based on the received B2B process template 234.

A process definition includes the definitions of services that are involved in the process and describes the flow of data and execution order among those services. When generating a process template 234 for a particular B2B interaction standard, such as RosettaNet, automatic process template generator 310 extracts definitions of individual B2B interaction points from structured representation 224 of a B2B interaction standard and passes these definitions to the automatic service template generator 330. The automatic service template generator 330 generates the service templates 174 for all B2B interaction points within the definition of process template 234. Then, the automatic process template generator 310 extracts the flow description from structured representation 224 of a B2B interaction standard and completes the process template 234 by adding individual service templates 174 thereto. Consequently, the template generator 170 can generate both service templates 174 and process templates 234 during a single pass over the structured representation 224 of a B2B interaction standard.

The B2B template generator 170 may also include a structured representation generator 350 for receiving a description 214 of an interaction standard and based thereon for generating the structured representation 224. As described previously, the description 214 may include a text portion 216 and a graphical portion 218 (e.g., data in UML format). The description 214 may be provided by a source (e.g., RosettaNet Web site) of a particular B2B interaction standard. It is noted that conversion of the description 214 to a structured representation may be performed by a human (e.g., a workflow designer) or by software.

Alternatively, the structured representation 224 may be provided directly from a source of B2B interaction standard (e.g., a developer or publisher of a particular B2B interaction standard). When the structured representation 224 is provided by the source 360, the structured representation generator 350 is not needed.

The automatically generated templates of the present invention provide several significant advantages. First, the templates accelerate development of new B2B capable processes. Second, the templates enable existing processes to be enhanced in an efficient manner so that the processes can carry out B2B interactions (i.e., become B2B capable). Third, service templates from different B2B standards can be plugged into the same workflow process when it is necessary to interact with multiple trade partners that use different B2B standards.

Fourth, changes in the standards can be applied to existing processes with minimal effort. For example, a change in the time limit for waiting for an acknowledgment message can be applied by a making a small modification in the TPCM parameters. Similarly, a change in an individual interaction type can be applied by replacing the definition of a B2B service in the service library. Moreover, a change in the overall definition of a B2B conversation can be applied by automatically re-generating the process template from the new structured definition of the corresponding standard.

B2B Service Library 150

By providing a set of B2B services in the B2B service library 150, the present invention reduces considerably the amount of manual effort needed in the design and implementation of workflows having B2B interaction. Consequently, one advantage of the design support tools of the present invention is that process designers can focus on the business logic required in the interactions rather than on message formats and message exchange protocols.

In one embodiment, the B2B service library 150 includes two types of B2B services: 1) B2B interaction services and 2) B2B start services. B2B interaction services include services that can be associated with work nodes. B2B start services include services that can be associated with start nodes. B2B interaction services and B2B start services are described in greater detail hereinafter.

Figure 7:
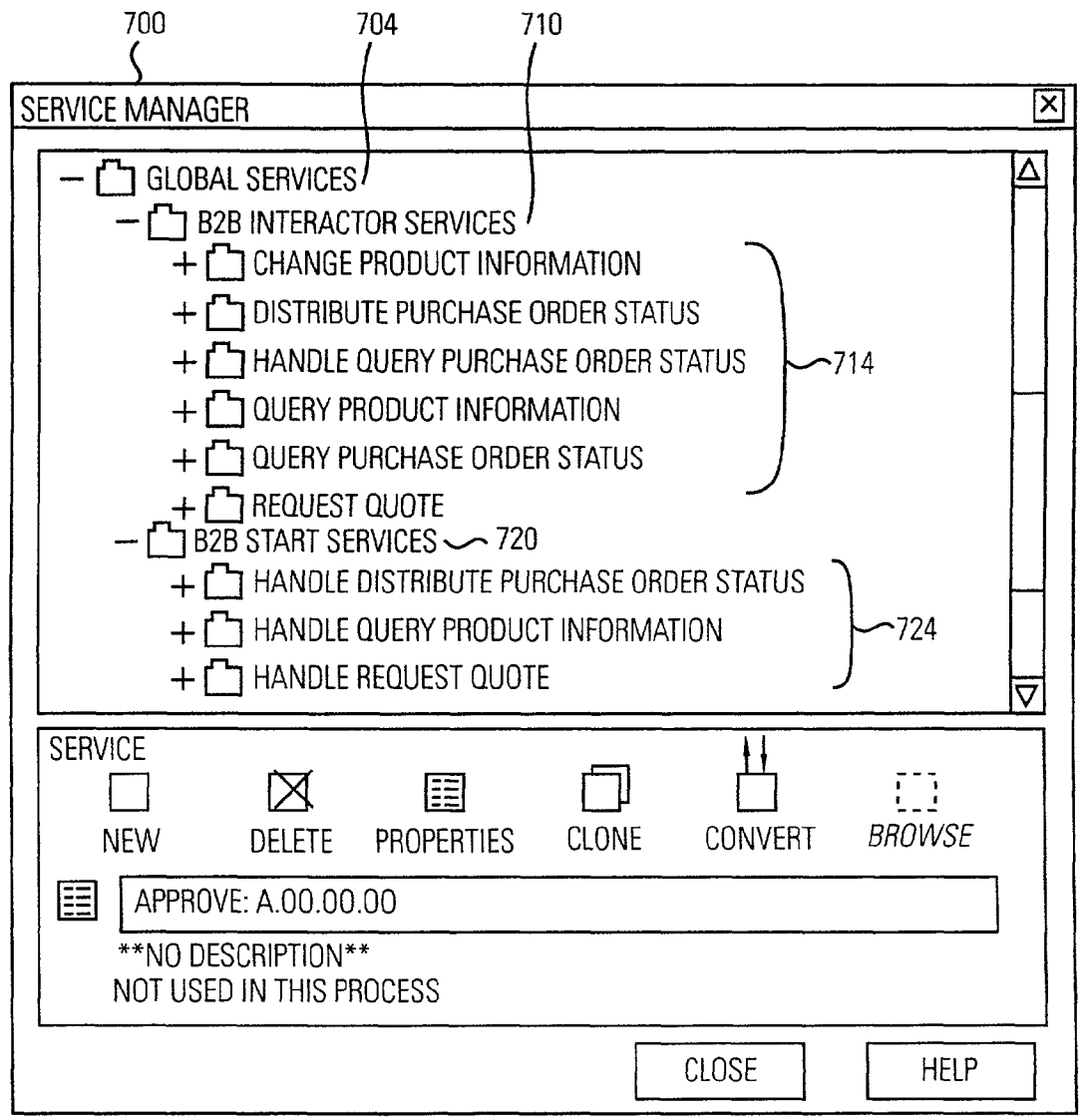
FIG. 7 illustrates a graphical user interface window that allows a user to select from a plurality of service templates.

FIG. 7 illustrates a graphical user interface window 700 that allows a user to select from a plurality of service templates. The Service Manager window 700 includes a Global Services folder 704 for storing the B2B interaction services. The Global Services folder 704 includes a B2B Interaction Services folder 710 and B2B Start Services folder 720. The B2B Interaction Services folder 710 includes a plurality of B2B interaction services 714 that are arranged in their respective folders, and the B2B Start Services folder 720 includes a plurality of B2B start services 724 arranged in their respective folders.

B2B Interaction Services 714

B2B interaction services 714 represent B2B messages to be sent to a business partner, messages received from a business partner, or a two-way message exchange. When the designer needs to define a workflow in which a B2B message is sent to another organization or in which a B2B message is received from another organization, the process designer simply creates a work node in the process definition and binds that node to a predefined B2B service.

The TPCM 140 handles 1) the mapping and packaging of input/output data, 2) the delivery of the message to the partner organization, 3) the receipt of the reply, and 4) the extraction of data from the reply and insertion of the data into the service output items.

In this manner, the TPCM 140 of the present invention greatly simplifies the definition of a new workflow or the enhancement of an existing workflow that has B2B interaction capability since the process designer does not need to be concerned with the conversation details.

The definition of a service includes the input and output data required to handle the message exchange (i.e., data needed to generate the outbound message and extract data from the reply). In addition to the message-specific input and output data items, B2B services preferably include the following data items: 1) B2B partner, 2) B2B Standard, 3) Discard Reply, 4) Termination Status, and 5) Conversation Identifier (ID).

A particular B2B trade partner can be specified. When a particular partner is not specified, a default value partner (e.g., a broker/dispatcher) that is specified at the TPCM level may be employed. In situations where all interactions go through a broker/dispatcher, this approach is especially useful to simplify process definition and management.

A particular B2B standard may also be specified. If no standard is specified, a predetermined default standard (e.g., RosettaNet) may be utilized. The Discard Reply field indicates whether a reply is expected. The Termination Status field provides a return value of the service. The Conversation ID field is used for tracking conversations that involve multiple message exchanges with the same trade partner.

TABLE I illustrates an exemplary input data for a service call. TABLE II shows the output data from the same service call.

TABLE I

Service Name: Request for Quote
B2B partner: Hewlett-Packard
B2B Standard: RosettaNet
Discard Reply: false
Conversation ID: 543123
Service Data:

Product ID: P1234
Product Name: hp pavilion 2960
Quantity: 2

TABLE II

Service Name: Request for Quote
B2B partner: Hewlett-Packard
B2B Standard: RosettaNet
Termination Status: 0 (Success)
Conversation ID: 543123
Service Data:
Product ID: P1234

Product Name: hp pavilion 2960
Quantity: 20
Quote: $1999

B2B Start Services 724

Start services 724 are associated to start nodes, which represent the actions during the initiation of new process instances. B2B start services are used for initiating particular process instances when a predefined B2B message is received. When a designer needs to define a process that is activated upon receiving a given B2B message, the process designer simply associates the B2B start service, corresponding to the message, with the start node of the process. The TPCM 140 starts a new instance of the process when such a message arrives and fills in the process input data with data extracted from the message.

Process Templates 178

Process templates are skeletons of workflows that can be reused and extended in order to implement a B2B interaction standard. The skeleton defines the conversational logic according to the protocol defined by a particular B2B interaction standard. The process designer can extend the skeleton to define the complete business logic. Referring again to FIG. 2, the process template 234 handles "Request for Quote" (RFQ) messages. The process template 234 is listed in a TPCM repository, which is described in greater detail hereinafter, as the process to be started when an RFQ message is received.

Work node rfq_reply sends the quote to the requester. In addition, a parallel path including the work node rfq_deadline is started. The work node rfq_deadline includes a maximum time, allowed by the B2B interaction specifications, for a RFQ reply to be received. Once the time has expired, a deadline is triggered, and the process terminates in the deadline_expired end node.

When defining a process to provide a quote, the designer may extend the process template 234 to include the appropriate business logic. For example, additional nodes, flows, and data items may be inserted to generate the complete process 244 as shown in FIG. 2. Work nodes rfq_deadline and rfq_reply are analogous to the similarly labeled work nodes in the process template 234.

In some cases, it may be desirable to have the capability to submit an error message to a trade partner or an authorized person within the organization when the rfq_deadline expires. In order to include that capability in the process, a process designer may add a work node (e.g., Notify_Sales_Administration node) that is associated with a service for sending a message to the sales administrator of the organization when the deadline expires.

Trade Partners Conversation Manager 140

The TPCM 140 is an application that acts as a workflow resource. The TPCM 140 executes B2B services by sending a B2B message to a trade partner, possibly waiting for a reply, and extracting data from the reply before returning the service to the WfMS 130. The TPCM can also be instructed to activate a given process instance when a B2B message of a specified type is received. The content of the repository accessed by the TPCM and the operation of the TPCM are now described.

The TPCM 140 allows users to design processes without having to know details about the interaction standards. Furthermore, the TPCM automatically handles which standard to use based on the preferred standard of the trade partner. Moreover, the TPCM 140 handles the details of sending/receiving messages, waiting for responses, etc., thereby allowing the process designer to focus on designing workflow to meet the needs of the business.

TPCM Repository 144

The TPCM 140 includes a repository 144 for storing information for each B2B service. The repository 144 can, for example, include the following information items for each B2B service defined in the service library: 1) an XML template document 146, and 2) a set of XQL queries 148.

The XML template document 146 can conform to the DTD or XML schema of the outbound message type. The XML templates 146 are used by the TPCM 140 to generate outbound messages as B2B services are invoked. TABLE III illustrates an exemplary XML document template.

The XML templates 146 may include references to service input data as denoted with %% signs for customizing the message with process instance specific data. XML templates are generated from the XML DTD or schema language definitions that are provided by B2B interaction standards. Any reference to a service data item name is included between double percent symbols (e.g., %%Contact_Name%%). While preparing a B2B message, the TPCM 140 retrieves the XML template 146 from the repository, replaces service data item references with the actual value of those data items, and then submits the B2B message, which contains the XML document to the trade partner.

The set of XQL queries 148 can include, for example, one query for each output data item of the service. XQL queries 148 are used by TPCM to parse received XML documents and feed received data into the service data items. TABLE IV illustrates a set of exemplary XQL queries, associated with the RFQ service, for use in parsing the document of TABLE III.

TABLE III

```
<?xml version="1.0"?>
<Pip3A1QuoteRequest>
    <fromRole>
        <PartnerRoleDescription>
            <ContactInformation>
                <contactName>
                    <FreeFormText xml:lang="en-US">
                        %%ContactName%%
                    </FreeFormText>
                </contactName>
                <EmailAddress>
                    %%ContactEmail%%
                </EmailAddress>
                <telephoneNumber>
                    %%ContactTelephoneNumber%%
                </telephoneNumber>
            </ContactInformation>
            . . .
        </PartnerRoleDescription>
    </fromRole>
</Pip3A1QuoteRequest>
```

TABLE IV

```
ContactInformation/contactName/FreeFormText
ContactInformation/EmailAddress
```

Execution of B2B Services

Figure 5:
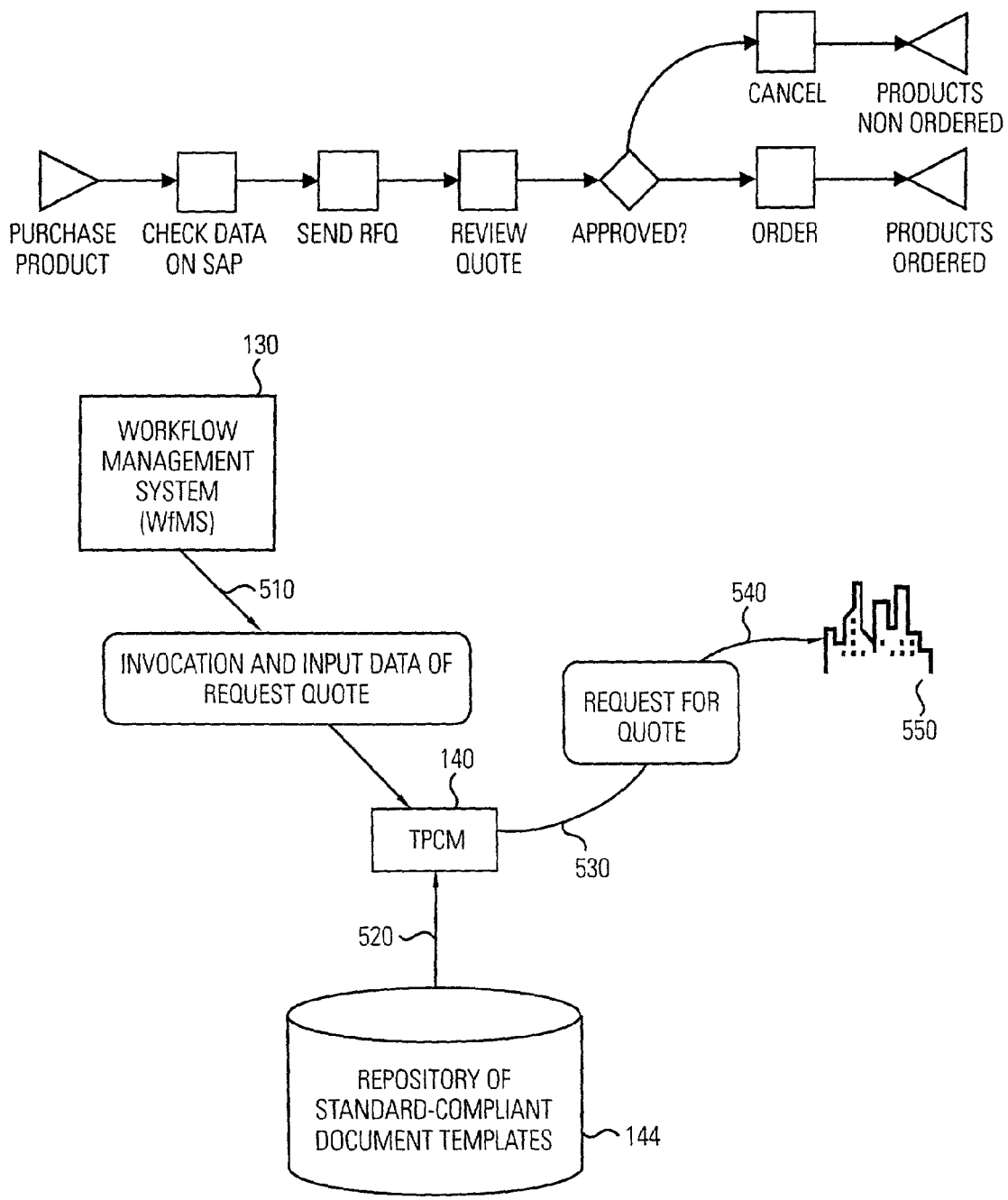
FIG. 5 illustrates the processing steps performed by the TPCM of FIG. 1 when submitting B2B messages according to one embodiment of the present invention.

FIG. 5 illustrates the processing steps performed by the TPCM of FIG. 1 when submitting B2B messages according to one embodiment of the present invention. Depending on the operation of the WfMS 130, the TPCM 140 either periodically polls the WfMS to check if there is a B2B service to be executed or waits for the notification message of a particular event occurrence from the WfMS 130.

In step 510, the TPCM 140 retrieves the service name and input data from the WfMS 130. For example, when a node "Send RFQ" is scheduled by the WfMS 130 for execution, the service "Request Quote" is invoked along with the input parameter.

In step 520, the TPCM 140 retrieves the XML template that is associated to the service from the repository 144. For example, the TPCM retrieves the document template corresponding to the B2B service "Request Quote" and to the specified protocol or a predetermined default protocol when no protocol is specified. In general, the repository 144 may have one entry per service and per protocol.

In step 530, the TPCM 140 generates an outbound message and replaces all the references to service input data items with their actual values. For example, the TPCM 140 can build the B2B outbound message by instantiating the document template (i.e., replacing the parametric parts with actual values) and by packaging the instantiated document template into a standard-compliant message with an appropriate header.

In step 540, the TPCM 140 sends the document to a trade partner 550 that is specified by B2B partner input data item. When no B2B partner is specified, the document may be sent to a predetermined default B2B partner.

If no reply is expected after a message submission, the TPCM 140 returns the completed service results to the WfMS 130. Otherwise, the TPCM 140 waits to receive a reply.

It is noted that the node "Send RFQ" is bound at process definition time to the B2B service "Request Quote" that is retrieved from the B2B service repository 144.

Figure 6:
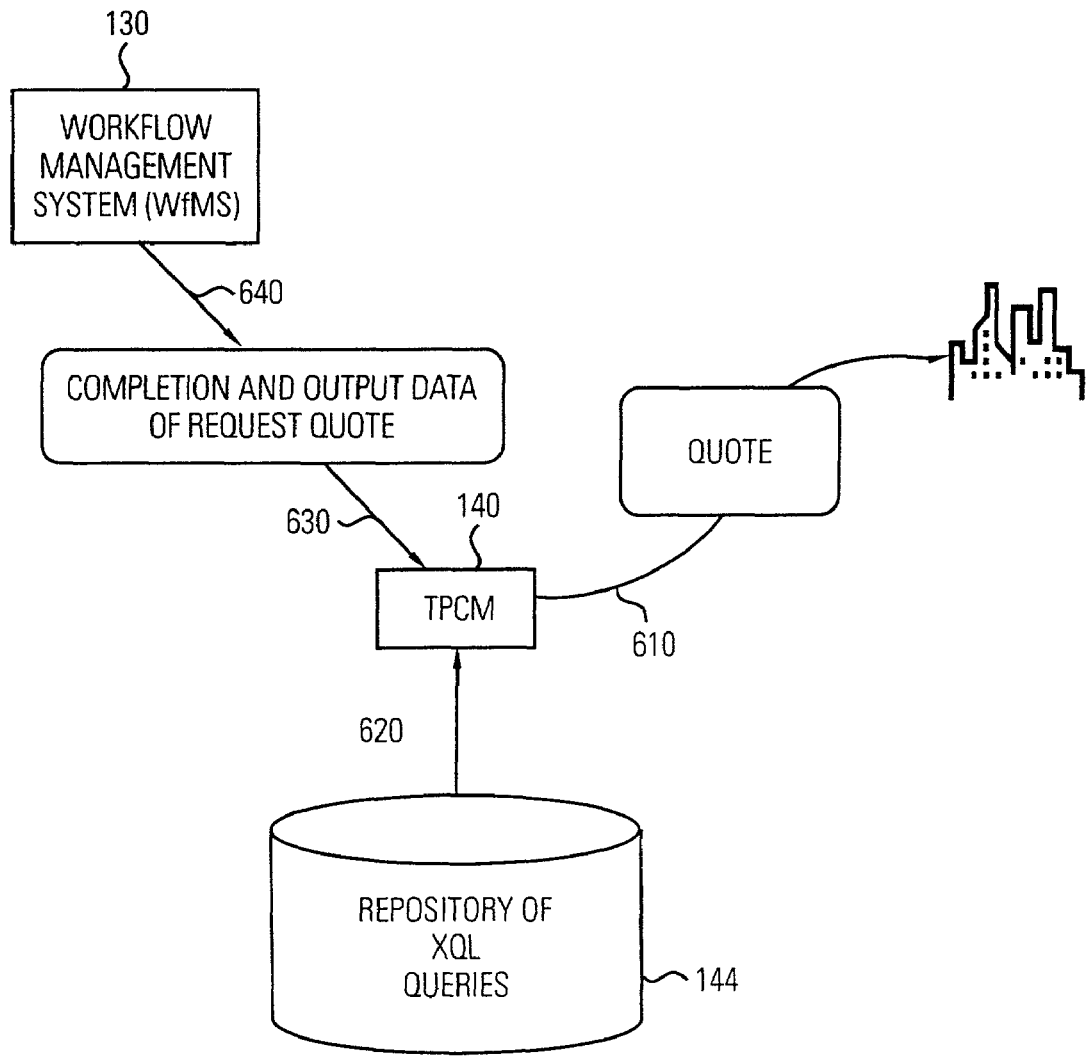
FIG. 6 illustrates the processing steps performed by the TPCM of FIG. 1 upon receiving a reply according to one embodiment of the present invention.

FIG. 6 illustrates the processing steps performed by the TPCM 140 of FIG. 1 upon receiving a reply according to one embodiment of the present invention. In step 610, the reply is received. For example, a partner sends the requested quote in the form of a standard compliant XML document that is encapsulated in a standard-compliant message.

In step 620, the TPCM 140 accesses the repository 144 in order to retrieve the set of XQL queries associated with the service. The TPCM 140 retrieves the XQL queries in order to use the queries to extract data from the received document. An appropriate set of queries is determined based on the type of document received and on the B2B interaction standard (e.g., a RosettNet quote document).

In step 630, for each output data item, the TPCM 140 executes the XQL queries on the received document, thereby determining the values of the attributes to be passed back to the calling workflow as service output data.

In step 640, the extracted data is made available to the data items of the B2B service. The service execution is now completed, and the output values are returned to the WfMS 130. The WfMS 130 updates the case packet of the calling workflow and then schedules the next node for execution. TABLE V illustrates a sample RFQ reply in XML format and the values assigned to the service data items.

TABLE V

```
<?xml version="1.0"?>
<Pip3A1QuoteResponse>
    <fromRole>
        <PartnerRoleDescription>
            <ContactInformation>
                <contactName>
                    <FreeFormText xml:lang="en-US">
                        Mary Brown
                    </FreeFormText>
                </contactName>
                <EmailAddress>
                    amy@mycompany.com
                </EmailAddress>
                <telephoneNumber>
                    1-323-5551212
                </telephoneNumber>
            </ContactInformation>
            . . .
        </PartnerRoleDescription>
    </fromRole>
</Pip3A1QuoteResponse>
```

Message-driven Process Instantiation

The TPCM 140 can be instructed to activate a process instance in order to process a request coming from a business partner. When the TPCM 140 receives a message that is not a reply to a previous request, the TPCM 140 checks if there is a B2B start service associated to the messages of that type. When there is a B2B start service associated to the messages of that type, the TPCM 140 retrieves the XQL queries associated to the service data items, executes them against the inbound message in order to extract the data to be inserted into the input data items of the service, and then starts the process by executing the service associated with the start node of that process.

TPCM Implementation

After sending a request to a trade partner, the XML document response is received by a daemon process that listens to a specific port for the incoming messages. The data is extracted from the document and mapped into the service data items. The TPCM 140 needs to know which service instance of which process instance had initiated the request, so that the response can be delivered to that service instance. For this purpose, when submitting a message across the organizational boundaries, the TPCM 140 keeps a record of the service and process instance that is relevant to the message.

Preferably, the TPCM 140 tracks the following information from the service instance that wants to submit an interaction message to an external organization: 1) the name of the trade partner to which the message is going to be sent, and 2) the process instance and service identifiers for the B2B service that submitted the message. The TPCM 140 also manages a table that maps a trade partner name into the IP address and port number of a trade partner.

Furthermore, the TPCM 140 automatically generates a document identification number for uniquely identifying the document that is being submitted and its response. The document identifier is then piggybacked in the response message. The TPCM 140 records the document, process instance, and service identifiers in the repository 144 so that the TPCM 140 can locate the process instance and service when the response with the same document identifier arrives.

Automatic Generation of B2B Service Definitions from Structured Definitions of Standards Individual message exchanges between trade partners are defined either as a collection of XML Document Type Definitions (DTDs) or schema language definitions depending on the industry standard that is utilized. Consequently, B2B service definitions are generated from XML DTD or schema language definitions and contain the inputs and outputs that are necessary for XML document exchanges. One advantage of the TPCM 140 of the present invention is that the TPCM 140 hides the details of the B2B interaction standards and message exchange protocols from the service definition.

Automatic Generation of Process Templates from Structured Definitions of Standards An example of how process templates are generated from RosettaNet Partner Interface Processes (PIPs) is described hereinafter. However, it is noted that those of ordinary skill in the art can easily extend the teachings of the present invention to automatically generate process templates from other B2B interaction standards.

In the RosettaNet interaction standard, the PIPs describe the conversational logic as a combination of textual and graphical representations. The overall flow of a PIP is described as a Unified Modeling Language (UML) graph, and the details, such as the deadlines, roles of business partners, etc., are explained as flat text. In the prior art, the process designer manually read the PIP definitions and manually integrate a particular workflow management system to the PIP definitions (i.e., manually develop or modify business processes so that the processes are B2B capable).

One aspect of the present invention is to represent a B2B interaction standard (e.g., RosettaNet PIPs) in a structured textual format to enable the template generator 170 to automatically generate process templates that support interaction standards (e.g., RosettaNet PIPs).

The present invention employs XML Metadata Interchange (XMI) to represent the conversational logic of B2B interaction standards.

The present invention creates process templates from structured definitions of B2B interaction standards by performing the following two steps: (1) describing B2B conversational logic, such as a PIP, in XMI; and (2) generating a process template from an XMI definition.

XMI Representation of RosettaNet PIPs

Figure 9:
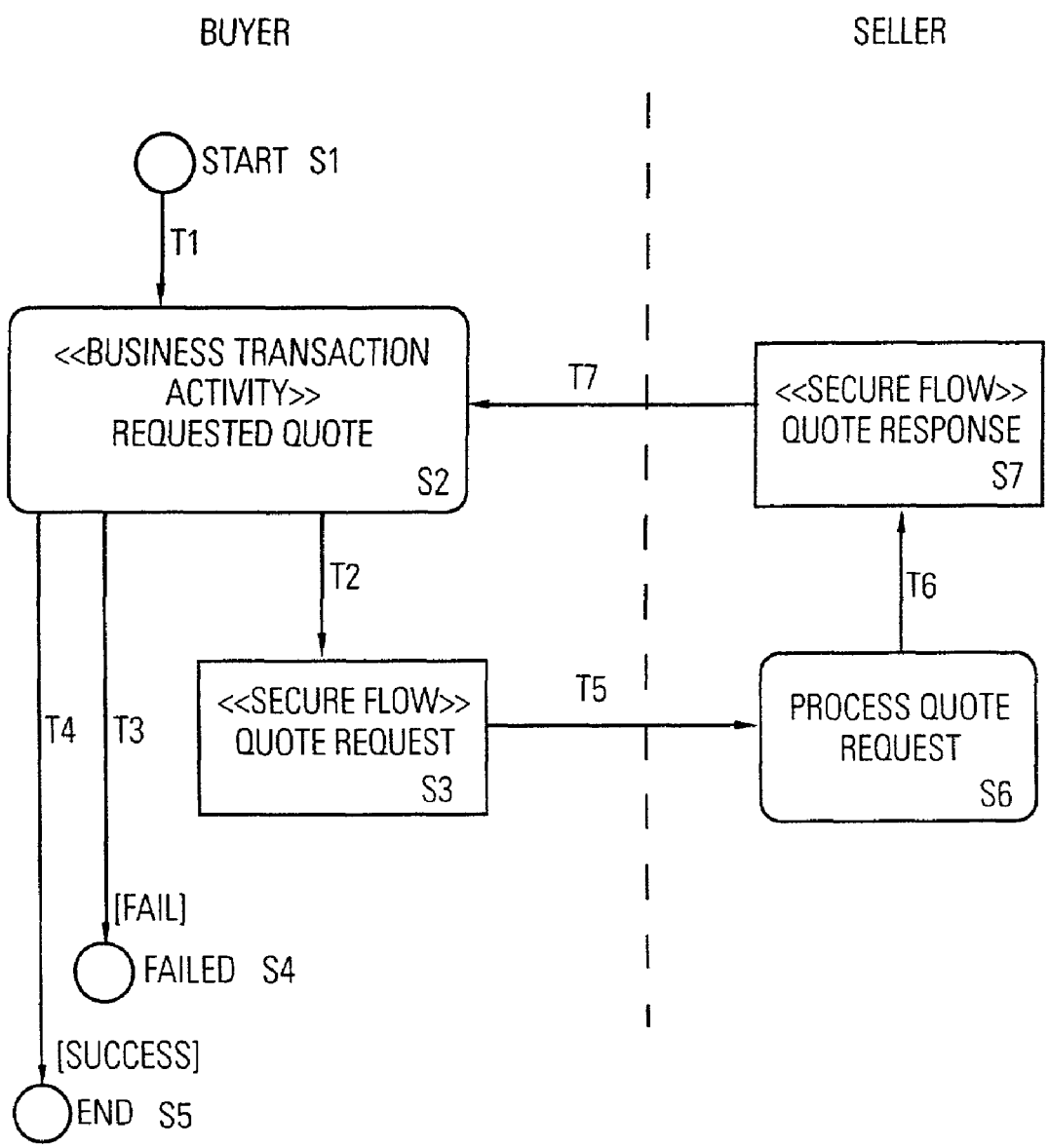
FIG. 9 illustrates a prior art partner interface process that defines an interaction standard for a request for quote.

TABLE VI illustrates an exemplary structured definition (i.e., an XMI description of the RosettaNet partner interface process (PIP) illustrated in FIG. 9) utilized by the automatic process template generator according to one embodiment of the present invention. TABLE VI omits some details in the XMI definitions and shows only important XMI tags for the description of the PIP.

In this embodiment, the XMI description includes a header portion and a content portion. The header portion provides general information about the contents of the XMI document and the XMI version that is being used. The content portion includes a state diagram that describes the states (e.g., activities) and the transitions between the states. XMI uses identification codes for all objects defined in it. The identification code is defined using the xmi.id tag. The states are labeled S.1, S.2, S.3, etc. Similarly, the transitions between those states are labeled T.1, T.2, T.3, etc.

TABLE VI

```
File="RequestQuote xml" Namespace="RequestQuote";
<XMI version="1.1" xmlns.UML="org.omg/UML1 3">
    <XMI header>
        <XMI model xmi name="RequestQuote" href=
        "RequestQuote.xml"/>
        <XMI metamodel xmi name="UML" href="UML xml"/>
    </XMI.header>
    <XMI.content>
        <Behavioral_Elements State_Machines StateMachine
        xmi.id="PIP.001">
        <Foundation Core ModelElement.name>
            Quote Request State Activity Model
        </Foundotion Core ModelElement name>
        <Foundatton Core ModelElement visibility xmi value=
        "public">
        <Behavioral_Elements State_Machines.StateMachine top>
        <!-- Define Start state -->
        <Behavioral_Elements.State_Machines.Simplestate
        xmi.id="S.1">
            <Behavioral_Elements State_Machines
            Statevertex.outgoing>
                <Behavioral_Elements.State_Machines.Transition
                xmi.idref="T.1"/>
            </Behavioral_Elements State_Machines Statevertex
            outgoing>
        <!-- Define Request Quote -->
        <Behavioral_Elements.State_Machines Simplestate
        xmi.id="S.2">
            <Behavioral_Elements State_Machines
            Statevertex.outgoing>
                <Behavioral_Elements State_Machines.Transition
                xmi.idref="T 2"/>
                <Behavioral_Elements State_Machines Transition
                xmi idref="T 3"/>
                <Behavioral_Elements.State_Machines Transition
                xmi idref="T.4"/>
```

TABLE VI-continued

```
        </Behavioral_Elements State_Machines Statevertex
           outgoing>
        <Behavioral_Elements State_Machines.Statevertex.
           incoming>
            <Behavioral_Elements State_Machines.Transition
               xmi.idref="T.1"/>
            <Behavioral_Elements.State_Machines.Transition
               xmi.idref="T.7"/>
        </Behavioral_Elements.State_Machines Statevertex.
           incoming>
    </Behavioral_Elements State_Machines.Simplestate>
    <!-- Define Quote Request -->
    <Behavioral_Elements.State_Machines.Simplestate
       xmi id="S 3">
        <Behavioral_Elements State_Machines Statevertex.
           outgoing>
            <Behavioral_Elements.State_Machines.Transition
               xmi.idrefr="T.5"/>
        </Behavioral_Elements.State_Machines Statevertex
           outgoing>
        <Behavioral_Elements State_Machines.Stateverlex.
           incoming>
            <Behavioral_Elements.State_Machines.Transition
               xmi idref="T 2"/>
        </Behavioral_Elements.State_Machines.Statevertex.
           incoming>
    </Behavioral_Elements.State_Machines Simplestate>
    <!-- Define other states -->
    <!-- Define transitions between states -- >
    <!-- Transition T.1:from Start to Request Quote -->
    <Behavioral_Elements State_Machines Transition
       xmi id="T 1">
        <Behavioral_Elements State_Machines Transition source>
            <Behavioral_Elements State_Machines Simplestate
               xmi.idref="S 1">
        </Behavioral_Elements.State_Machines.Transition
           source>
        <Behavioral_Elements.State_Machines Transition target>
            <Behavioral_Elements.State_Machines Simplestate
               xmi idref="S.2">
        </Behavioral_Elements.State_Machines Transition target>
    </Behavioral_Elements.State_Machines Transition>
    <!--Transition T.2:from Request Quote to Quote
       Request -->
    <Behavioral_Elements State_Machines.Transition
       xmi.id="T 2">
        <Behavioral_Elements_State_Machines.Transition source>
            <Behavioral_Elements.State_Machines Simplestate
               xmi.idref="S.2">
        </Behavioral_Elements State_Machines.Transition.
           source>
        <Behavioral_Elements State_Machines Transition.target>
            <Behavioral_Elements State_Machines Simplestate
               xmi.idref="S.3">
        </Behavioral_Elements.State_Machines.Transition.target>
    </Behavioral_Elements State_Machines Transition>
    <!-- Define other transitions -->
</Behavioral_Elements.State_Machines StateMachine>
<!-- Describe services and XML documents to be used at
   B2B services -->
<Data_Elements Services>
    <Data_Elements.ServiceDescriptions.ServiceDescription>
        <Data_Elements ServiceDescriptions.Name="Start">
        <Data_Elements.ServiceDescriptions State="S1">
    </Data_Elements.ServiceDescriptions ServiceDescription>
    <Data_Elements.ServiceDescriptions ServiceDescription>
        <Data_Elements ServiceDescriptions.Name="Request
           Quote">
        <Data_Elements.ServiceDescriptions.State "S2">
</Data_Elements.ServiceDescriptions ServiceDescription>
<Data_Elements ServiceDescriptions.ServiceDescription>
        <Data_Elements.ServiceDescrtptions.Name="Quote
           Request">
        <Data_Elements.ServiceDescriptions.State="S3">
        <Data_Elements.ServiceDescriptions.
           XMLDocument=
   "3A1QuoteRequestMessageGuideline_vl_0 xml">
    </Data_Elements.ServiceDescriptions.ServiceDescrtption>
</Data_Elements.Services>
    <Data_Elements DocumentTemplates>
        <Data_Elements.DocumentTemplates Name=
           "3A1QuoteRequestMessageGuideline_vl
           0.xml">
            <Data_Elements DocumentTemplates Contents>
                <?xml version"1.0"?>
    <!DOCTYPE Pip3A1QuoteRequest SYSTEM
       "3A1QuoteRequestMessageGuideline_vl_0.xml">
        <Pip3A1QuoteRequest>
            <fromRole>
                <PartnerRoleDescription>
                    <ContactInformation>
                        <contactName>
                            <FreeFormText xml:lang="en-US">
                                %%ContactName%%
                            </FreeFormText>
                        </contactName>
                        <EmailAddress>
                            %%ContactEmail%%
                        </EmailAddress>
                        <telephoneNumber>
                            %%ContactTelephoneNumber%%
                        </telephoneNumber>
                    </ContactInformation>
                </PartnerRoleDescriptton>
            </fromRole>
        </Pip3A1 QuoteRequest>
    </Data_Elements DocumentTemplates Contents>
</Data_Elements DocumentTemplates>
    </XMI content>
</XMI>
```

Process Template Generation from XMI Definitions

Figure 4:
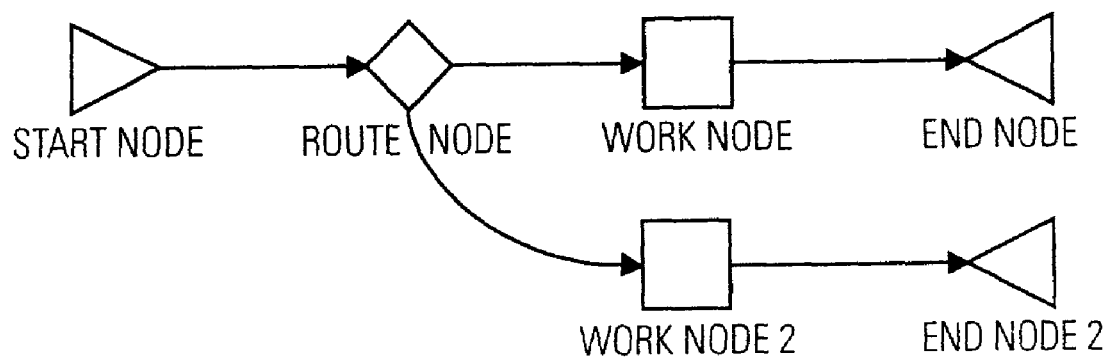
FIG. 4 illustrates an exemplary process definition utilized by a workflow management system according to one embodiment of the present invention.

Most WfMSs, including the HP Process Manager (HPPM), store the process flow using state diagrams. Consequently, the automatic process template generator 310 can convert the XMI description of a conversational standard into a process flow description of a WfMS, such as HPPM, in an efficient manner. An HPPM process is stored as a collection of XML documents and a graphical layout file. The XML documents contain the Process Map, which describes the flow of the process, and the services and resources that are involved in the process. The graphical layout file describes the locations of process nodes and the arcs (e.g., links) on a 2-dimensional plane so that HPPM's process definer can display a graphical flow diagram of the process to the users. FIG. 4 illustrates an exemplary graphical flow diagram utilized by the HPPM.

Exemplary Process Created from Multiple Partner Interface Processes

Figure 8:
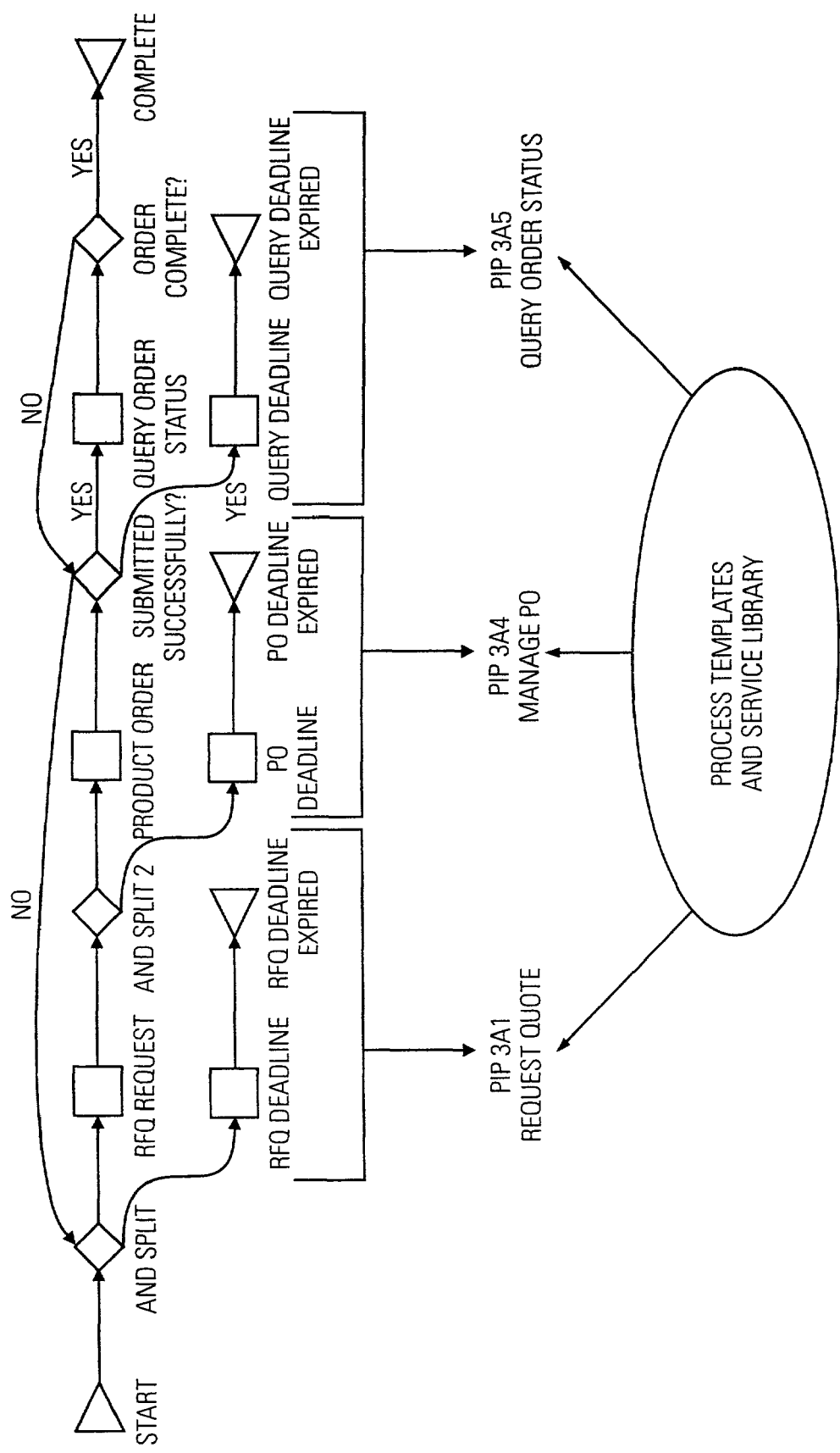
FIG. 8 illustrates an exemplary process that is built from process templates of multiple partner interface processes according to one embodiment of the present invention.

FIG. 8 illustrates an exemplary process that is built from process templates of multiple partner interface processes according to one embodiment of the present invention. As described earlier, a designer can create processes by using the process templates and service library generated by the present invention.

For example, a new business process in your organization for Order Management that you want to create, The Order Management process manages the quote request, order submission, and query of the order status. RosettaNet provides three different PIPs for those three steps of Order Management. Those PIPs are: PIP 3A1 Request Quote that submits a quote request and receives the response from a trade partner, PIP 3A4 Manage PO that submits, updates, or cancels a purchase order, and PIP 3A5 Query Order Status that keeps track of a previously submitted order's status.

The process templates for these PIPs can be automatically generated by the present invention as described previously. The process templates and individual B2B services are then stored in a repository, from which they can be retrieved by a user and inserted into a new or existing process definition.

Referring to FIG. 8, an exemplary process that manages quote request, purchase order submission, and order status query is created in this fashion. A developer can start the design of a new process by retrieving the PIP 3A1 template and inserting it at the beginning of the new process definition. Then, the templates for the PIPs 3A4 and 3A5 can be appended after the first template. It is noted that minor corrections may be needed to ensure that the data items of successive process templates are compatible with each other.

A user can also efficiently and quickly make some small modifications on the process definition, such as adding more nodes to add more functionality to the new process. For example, the user might want to store the received quote in a database. The user can perform the store by simply inserting a node after the template of PIP 3A1 in order to store the quote in a database. The templates provide processes, which can be added together and enhanced with more nodes to achieve more functionality.

Adding B2B Interaction Capability to Existing Internal Processes

The example described previously concentrates on the automatic generation of new processes that support B2B interaction standards. Specifically, when the conversational logic is provided in XMI format, the automatic template generator automatically generates a HPPM process template (e.g., a HPPM process template) that supports the standard.

In an alternative scenario, many organizations may already have internal business processes, which need to be enhanced so that the processes can interact with the trade partners of other organizations. In this embodiment, a designer can employ the service library to plug in B2B interaction services into an existing process. For example, the service templates may handle the interaction points with the trade partners by utilizing an industry standard, such as RosettaNet. It is noted that the existing processes do not have to be modified. The existing processes need only be enhanced by inserting the service templates at the nodes where the interactions with trade partners occur.

Support for Multiple B2B Standards

The integration method and system of the present invention has been described with reference to the HPPM WfMS and RosettaNet PIPs. However, it is to be appreciated that the teachings of the present invention can be applied to integrate other interaction standards with other workflow management systems. An important step in the integration of interaction standards to a workflow management system of according to the present invention is the generation of templates in three detail levels: 1) process, 2) service, and 3) XML document formats.

For example, templates for CBL, EDI, and other B2B interaction standards may be generated from the XMI descriptions of the message flow and contents in accordance with the teachings of the present invention as described previously. Once the templates are stored in the template library, the users can access the needed templates and plug the templates into the process flow diagrams.

The tools and mechanisms of the present invention have been described in the context of integrating HPPM processes with RosettaNet PIPs as an example. It is to be appreciated that the tools, mechanisms, and teachings of the present invention can be extended to support other WfMSs and other B2B interaction standards.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for supporting workflow design comprising the steps of:
    a) receiving a description of a business-to-business interaction standard;
    b) converting the description of business-to-business interaction standard to a structured representation of the business-to-business interaction standard;
    c) automatically generating at least one process template based on the structured representation of the business-to-business interaction standard; and
    d) using the process template to design a workflow.

2. The method of claim 1 wherein the description of an electronic business-to-business interaction standard includes a description of one of RosettaNet, CBL, EDI, OSI, and cXML.

3. The method of claim 1 wherein converting the description of the electronic business-to-business interaction standard to a structured representation of the business-to-business interaction standard includes
    for each state, defining all income transitions and all outgoing transitions; and
    for each transition, defining a source state and a target state.

4. The method of claim 1 wherein converting the description of the electronic business-to-business interaction standard to a structured representation of the business-to-business interaction standard further includes
    representing data in a structured form by employing a mark-up language.

5. The method of claim 1 wherein the structured process definition includes structured data and structured data flow.

6. The method of claim 1 wherein the structured process definition includes an XMI that includes at least one XML document.

7. The method of claim 1 wherein automatically converting the structured data and flow into at least one process template includes
    automatically converting the structured data and flow into at least one process template that is specific to a particular workflow management system.

8. The method of claim 1 further comprising the steps of:
    storing the process templates into a process template repository; wherein the process templates are accessible to a workflow designer; and
    storing the service templates into a service template repository; wherein the service templates are accessible to a workflow designer.

9. The method of claim 1 wherein using the process template to design a workflow includes
    retrieving a process template from the process template repository; and
    adding at least one local service to the process template.

10. The method of claim 1 wherein using the process template to design a workflow includes
    designing a process that includes a plurality of local services; and
    adding at least one interaction point service to the process.

11. A method for supporting workflow design comprising the steps of:
    a) receiving a high-level process definition;
    b) converting the high-level process definition into a structured data and flow;
    c) automatically extracting at least one business-to-business (B2B) interaction point; and d) generating a business-to-business (B2B) service template for the extracted interaction point.

12. The method of claim 11 further comprising:

automatically extracting a plurality of business-to-business (B2B) interaction points; and generating a business-to-business (B2B) service template for each extracted interaction point.

13. The method of claim 11 wherein the business-to-business (B2B) service template confirms to a business-to-business interaction standard that includes one of RosettaNet, CBL, EDI, OBI, and cXML.

14. The method of claim 11 wherein converting the high-level process definition into a structured data and flow includes for each state, defining all incoming transitions and all outgoing transitions; and for each transition, defining a source state and a target state.

15. The method of claim 11 wherein converting the high-level process definition into a structured data and flow includes representing data in a structured form by employing a mark-up language.

16. The method of claim 11 wherein the structured process definition includes an XMI that includes at least one SML document.

17. A system for supporting the design of workflows comprising:

a processor;

a structured process definition generator for receiving a description of a business-to-business interaction standard and responsive thereto for generating a structured business-to-business process definition;

a process template generator for automatically generating a business-to-business process template based on a structured business-to-business process definition; and a process template repository for storing the business-to-business process templates.

18. The system of claim 17 further comprising:

a service template repository for storing business-to-business service templates.

* * * * *

UNITED STATES PATENT AND TRADEMARK OFFICE
CERTIFICATE OF CORRECTION

PATENT NO. : 7,840,934 B2  Page 1 of 1
APPLICATION NO. : 09/943223
DATED : November 23, 2010
INVENTOR(S) : Mehmet Sayal et al.

It is certified that error appears in the above-identified patent and that said Letters Patent is hereby corrected as shown below:

In column 18, line 18, in Claim 2, delete "OSI" and insert -- OBI --, therefor,

In column 18, line 24, in Claim 3, delete "income" and insert -- incoming --, therefor.

In column 19, line 10, in Claim 13, delete "confirms"and insert -- conforms --, therefor.

In column 20, line 4, in Claim 16, delete "SML" and insert -- XML --, therefor.

Signed and Sealed this
Twenty-second Day of March, 2011

David J. Kappos
*Director of the United States Patent and Trademark Office*